US 7,904,934 B2

(12) United States Patent
Kwon et al.

(10) Patent No.: US 7,904,934 B2
(45) Date of Patent: *Mar. 8, 2011

(54) DIGITAL CABLE TV RECEIVER, DIAGNOSIS METHOD FOR THE SAME, AND DATA STRUCTURE OF HDMI STATUS REPORT

(75) Inventors: Kwang Hun Kwon, Seoul (KR); Sang Hoon Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 368 days.

This patent is subject to a terminal disclaimer.

(21) Appl. No.: 11/593,467

(22) Filed: Nov. 7, 2006

(65) Prior Publication Data

US 2007/0056010 A1    Mar. 8, 2007

Related U.S. Application Data

(63) Continuation of application No. 11/178,949, filed on Jul. 12, 2005.

(30) Foreign Application Priority Data

Aug. 5, 2004    (KR) .................. 10-2004-0061804

(51) Int. Cl.
*H04N 7/16* (2006.01)
(52) U.S. Cl. .................................. 725/139; 725/151
(58) Field of Classification Search ............... None
See application file for complete search history.

(56) References Cited

U.S. PATENT DOCUMENTS

| 5,014,267 | A | 5/1991 | Tompkins et al. | |
|---|---|---|---|---|
| 5,442,472 | A | 8/1995 | Skrobko | |
| 5,511,167 | A | 4/1996 | Kawano et al. | |
| 5,646,675 | A | 7/1997 | Copriviza et al. | |
| 6,067,628 | A * | 5/2000 | Krithivas et al. ............. | 713/340 |
| 6,219,839 | B1 | 4/2001 | Sampsell | |
| 6,289,514 | B1 | 9/2001 | Link et al. | |
| 6,317,804 | B1 * | 11/2001 | Levy et al. ................... | 710/305 |
| 6,438,711 | B2 | 8/2002 | Woodruff | |
| 6,611,865 | B1 | 8/2003 | Perugini et al. | |
| 6,753,928 | B1 * | 6/2004 | Gospel et al. ................ | 348/569 |
| 6,915,531 | B2 * | 7/2005 | Yun .............................. | 725/131 |
| 6,959,263 | B2 | 10/2005 | Wilson et al. | |

(Continued)

FOREIGN PATENT DOCUMENTS

WO    WO 03/085618 A2    10/2003

OTHER PUBLICATIONS

Society of Cable Telecommunications Engineers: "Host-Pod Interface Standard-Host-Pod Interface Specification" Internet Citation, [Online] 2003, XP002408006, pp. 120-121, 127-128, 167-168. Retrieved from the Internet: URL: http://www.scte.org/docu ments/pdf/ansiscte282003dvs295, pdf.*

(Continued)

*Primary Examiner* — Brian T Pendleton
*Assistant Examiner* — Dika C. Okeke
(74) *Attorney, Agent, or Firm* — McKenna Long & Aldridge LLP

(57) ABSTRACT

A communication card includes a controller configured to forward a request to a device external to the communication card. The controller is further configured to receive HDMI status information associated with at least one HDMI port in response to the request.

8 Claims, 12 Drawing Sheets

U.S. PATENT DOCUMENTS

| | | |
|---|---|---|
| 7,047,196 B2 | 5/2006 | Calderone et al. |
| 7,135,985 B2 | 11/2006 | Woolgar et al. |
| 7,378,984 B2 * | 5/2008 | Suzuki et al. ............... 348/734 |
| 7,468,755 B2 | 12/2008 | Ando |
| 7,486,337 B2 * | 2/2009 | Bian ............................. 348/589 |
| 7,631,076 B2 * | 12/2009 | Cannon et al. ............... 709/225 |
| 2001/0011375 A1 | 8/2001 | Yun |
| 2002/0016969 A1 * | 2/2002 | Kimble ............................ 725/87 |
| 2002/0060676 A1 | 5/2002 | Kim |
| 2002/0078441 A1 | 6/2002 | Drake et al. |
| 2003/0009542 A1 | 1/2003 | Kasal et al. |
| 2003/0093812 A1 * | 5/2003 | Chang et al. ................. 725/133 |
| 2003/0110342 A1 | 6/2003 | Chiang et al. |
| 2004/0031058 A1 | 2/2004 | Reisman |
| 2004/0093370 A1 | 5/2004 | Blair et al. |
| 2004/0143847 A1 * | 7/2004 | Suzuki et al. .................. 725/61 |
| 2004/0158873 A1 | 8/2004 | Pasqualino |
| 2004/0239816 A1 | 12/2004 | Ando |
| 2004/0261126 A1 | 12/2004 | Addington et al. |
| 2005/0008323 A1 * | 1/2005 | Han ................................. 386/37 |
| 2005/0028211 A1 | 2/2005 | Mochizuki et al. |
| 2005/0034160 A1 * | 2/2005 | Kim et al. ..................... 725/149 |
| 2005/0144468 A1 | 6/2005 | Northcutt et al. |
| 2005/0183130 A1 | 8/2005 | Sadja et al. |
| 2005/0204163 A1 * | 9/2005 | Alkove et al. ................ 713/201 |
| 2005/0210333 A1 * | 9/2005 | Allue et al. ...................... 714/27 |
| 2005/0235307 A1 | 10/2005 | Relan et al. |
| 2005/0271072 A1 | 12/2005 | Anderson et al. |
| 2005/0289063 A1 * | 12/2005 | Lecomte et al. ................ 381/77 |
| 2006/0064583 A1 * | 3/2006 | Birnbaum et al. ............ 713/164 |
| 2006/0117371 A1 | 6/2006 | Margulis |
| 2006/0174310 A1 | 8/2006 | Lee et al. |
| 2006/0269056 A1 * | 11/2006 | Montag ............................ 725/25 |
| 2006/0282793 A1 * | 12/2006 | Stephens et al. ............... 715/810 |
| 2007/0118864 A1 * | 5/2007 | Champion et al. ............ 725/135 |
| 2007/0258699 A1 * | 11/2007 | Kikuchi et al. ................. 386/95 |
| 2008/0313316 A1 * | 12/2008 | Hite et al. ...................... 709/223 |

OTHER PUBLICATIONS

Society of Cable Telecommunications Engineers: "Host-Pod interface standard" [Online] ANSI/SCTE 28 2003, pp. 1-235, XP002408057.

Eidson S., et al.: "HDMI: High-Definition Multimedia Interface"—2003 SID International Symposium Digest of Technical Papers. Baltimore, MD, May 20-22, 2003, SID International Symposium Digest of Technical Papers, San Jose, CA: SID, US, vol. 34/2, May 20, 2003, pp. 1024-1027, XP001174221.

Consumer Electronics Association: "A DTV Profile for Uncompressed High Speed Digital Interfaces" CEA-861-B, May 2002, XP017005151, pp. 53-73.

HDMI Consortium: "High-Definition Mutimedia Interface, Spec v. 1.1" [Online], May 20, 2004, pp. 1-206, XP002408058.

Digital Visual Interface DVI, Revision 1.0, Apr. 2, 1999, pp. 1-76, XP002907715.

* cited by examiner

FIG. 1

| Syntax | # of bits | Mnemonic |
|---|---|---|
| Diagnostic_cnf() { | | |
|     Diagnostic_cnf_tag | 24 | uimsbf |
|     length_field() | | |
|     number_of_diag | 8 | uimsbf |
|     for(i=0; i<number_of_diag; i++){ | | |
|         Diagnostic_id | 8 | uimsbf |
|         Status_field | 8 | uimsbf |
|         if(status_field==0x00){ | | |
|         if(Diagnostic_id==0x00){ | | |
|           Memor_report() | | |
|         } | | |
|         else if (Diagnostic_id==0x01){ | | |
|           Software_ver_report() | | |
|         } | | |
|         else if (Diagnostic_id==0x02){ | | |
|           Firmware_ver_report() | | |
|         } | | |
|         else if (Diagnostic_id==0x03){ | | |
|           MAC_address_reprrt() | | |
|         } | | |
|         else if (Diagnostic_id==0x04){ | | |
|           FAT_status_report() | | |
|         } | | |
|         else if (Diagnostic_id==0x05){ | | |
|           FDC_status_report() | | |
|         } | | |
|         else if (Diagnostic_id==0x06){ | | |
|           Current_channel_report() | | |
|         } | | |
|         else if (Diagnostic_id==0x07){ | | |
|           1394_port_report() | | |
|         } | | |
|         else if(Diagnostic_id==0x08){ | | |
|           DVI_status_report() | | |
|         } | | |
|         } | | |
|     } | | |
| } | | |

FIG. 3

| Syntax | # of bits | Mnemonic |
|---|---|---|
| Diagnostic_cnf() { | | |
|     Diagnostic_cnf_tag | 24 | uimsbf |
|     length_field() | | |
|     number_of_diag | 8 | uimsbf |
|     for(i=0; i<number_of_diag; i++){ | | |
|         Diagnostic_id | 8 | uimsbf |
|         Status_field | 8 | uimsbf |
|         if(status_field==0x00){ | | |
|         if(Diagnostic_id==0x00){ | | |
|           Memor_report() | | |
|         } | | |
|         else if (Diagnostic_id==0x01){ | | |
|           Software_ver_report() | | |
|         } | | |
|         else if (Diagnostic_id==0x02){ | | |
|           Firmware_ver_report() | | |
|         } | | |
|         else if (Diagnostic_id==0x03){ | | |
|           MAC_address_reprrt() | | |
|         } | | |
|         else if (Diagnostic_id==0x04){ | | |
|           FAT_status_report() | | |
|         } | | |
|         else if (Diagnostic_id==0x05){ | | |
|           FDC_status_report() | | |
|         } | | |
|         else if (Diagnostic_id==0x06){ | | |
|           Current_channel_report() | | |
|         } | | |
|         else if (Diagnostic_id==0x07){ | | |
|           1394_port_report() | | |
|         } | | |
|         else if(Diagnostic_id==0x08){ | | |
|           HDMI_DVI_status_report() | | |
|         } | | |
|         } | | |
|     } | | |
| } | | |

FIG. 4A

| Syntax | # of bits | Mnemonic |
|---|---|---|
| HDMI_DVI_status_report(){ | | |
|   connection_status | 2 | Bslbf |
|   reserved | 6 | |
|   if(connection_status !=0x00){ | | |
|     connection_count | 8 | Uimsbf |
|     for(i=0; i<connection_count; i++){ | | |
|       connection_no | 8 | Uimsbf |
|       connection_mode | 1 | Bslbf |
|       connection_type | 2 | Bslbf |
|       host_HDCP_status | 1 | Bslbf |
|       device_HDCP_status | 2 | Bslbf |
|       reserved | 2 | |
|       video_format{ | | |
|         horizontal_lines | 16 | Uimsbf |
|         vertical_lines | 16 | Uimsbf |
|         scan_rate | 8 | Uimsbf |
|         aspect_ratio | 2 | Bslbf |
|         prog_inter_type | 1 | Bslbf |
|         reserved | 5 | |
|       } | | |
|       if(connection_mode==0x1){ | | |
|         auxiliary_information_status | 5 | Bslbf |
|         reserved | 3 | |
|         if(auxiliary_information_status & 0x01){ | | |
|           AVI_Info{ | | |
|             version | 8 | Uimsbf |
|             color_space | 2 | Bslbf |
|             active_format | 1 | Bslbf |
|             bar_info | 2 | Bslbf |
|             scan_info | 1 | Bslbf |
|             colorimetry | 2 | Bslbf |
|             aspect_ratio | 2 | Bslbf |
|             active_format_aspect_ratio | 4 | Bslbf |
|             picture_scaling | 2 | Bslbf |
|             video_id_code | 8 | Uimsbf |
|             pixel_repetition | 4 | Bslbf |
|             reserved | 4 | |
|           } | | |
|       } | | |

FIG. 4B

| Syntax | # of bits | Mnemonic |
|---|---|---|
| if(auxiliary_information_status & 0x02){ | | |
|   AUDIO_info{ | | |
|     version | 8 | Uimsbf |
|     audio_coding_type | 4 | Bslbf |
|     audio_channel_count | 3 | Bslbf |
|     sampling_frequency | 3 | Bslbf |
|     sample_size | 2 | Bslbf |
|     reserved | 4 | |
|     max_bit_rate | 8 | Uimsbf |
|     speaker_allocation | 8 | Uimsbf |
|     down_mix | 1 | Bslbf |
|     level_shift_value | 4 | Bslbf |
|     reserved | 3 | |
|   } | | |
| } | | |
| if(auxiliary_information_status & 0x04){ | | |
|   SPD_info{ | | |
|     version | | |
|     source_device_info | 8 | Uimsbf |
|     vendor_naem_character1 | 8 | Uimsbf |
|     vendor_naem_character2 | 8 | Uimsbf |
|     vendor_naem_character3 | 8 | Uimsbf |
|     vendor_naem_character4 | 8 | Uimsbf |
|     vendor_naem_character5 | 8 | Uimsbf |
|     vendor_naem_character6 | 8 | Uimsbf |
|     vendor_naem_character7 | 8 | Uimsbf |
|     vendor_naem_character8 | 8 | Uimsbf |
|     product_description_char1 | 8 | Uimsbf |
|     product_description_char2 | 8 | Uimsbf |
|     product_description_char3 | 8 | Uimsbf |
|     product_description_char4 | 8 | Uimsbf |
|     product_description_char5 | 8 | Uimsbf |
|     product_description_char6 | 8 | Uimsbf |
|     product_description_char7 | 8 | Uimsbf |
|     product_description_char8 | 8 | Uimsbf |
|     product_description_char9 | 8 | Uimsbf |

FIG. 4C

| Syntax | # of bits | Mnemonic |
|---|---|---|
|     product_description_char11 | 8 | Uimsbf |
|     product_description_char12 | 8 | Uimsbf |
|     product_description_char13 | 8 | Uimsbf |
|     product_description_char14 | 8 | Uimsbf |
|     product_description_char15 | 8 | Uimsbf |
|     product_description_char16 | 8 | Uimsbf |
|   } | | |
| } | | |
| if(auxiliary_information_status & 0x08){ | | |
|   MPEG_info{ | | |
|     version | 8 | Uimsbf |
|     mpeg_bit_rate0 | 8 | Uimsbf |
|     mpeg_bit_rate1 | 8 | Uimsbf |
|     mpeg_bit_rate2 | 8 | Uimsbf |
|     mpeg_bit_rate3 | 8 | Uimsbf |
|     field_repeat | 1 | Bslbf |
|     mpeg_frame | 2 | Bslbf |
|     reserved | 5 | |
|   } | | |
| } | | |
| if(auxiliary_information_status & 0x10){ | | |
|   GC_info{ | | |
|     version | 8 | Uimsbf |
|     cp_byte | 1 | Bslbf |
|     reserved | 7 | |
|   } | | |
|   } | | |
|  } | | |
|  } | | |
| } | | |
| } | | |
| } | | |

FIG. 7A

| Syntax | # of bits | Mnemonic |
|---|---|---|
| HDMI_status_report(){ | | |
|   connection_status | 2 | Bslbf |
|   reserved | 6 | |
|   if(connection_status !=0x00){ | | |
|     connection_count | 8 | Uimsbf |
|     for(i=0; i<connection_count;i++){ | | |
|       connection_no | 8 | Uimsbf |
|       connection_type | 2 | Bslbf |
|       host_HDCP_status | 1 | Bslbf |
|       device_HDCP_status | 2 | Bslbf |
|       reserved | 2 | |
|       video_format{ | | |
|         horizontal_lines | 16 | Uimsbf |
|         vertical_lines | 16 | Uimsbf |
|         scan_rate | 8 | Uimsbf |
|         aspect_ratio | 2 | Bslbf |
|         prog_inter_type | 1 | Bslbf |
|         reserved | 5 | |
|       } | | |
|       auxiliary_information_status | 5 | Bslbf |
|         reserved | 3 | |
|         if(auxiliary_information_status & 0x01){ | | |
|           AVI_Info{ | | |
|             version | 8 | Uimsbf |
|             color_space | 2 | Bslbf |
|             active_format | 1 | Bslbf |
|             bar_info | 2 | Bslbf |
|             scan_info | 1 | Bslbf |
|             colorimetry | 2 | Bslbf |
|             aspect_ratio | 2 | Bslbf |
|             active_format_aspect_ratio | 4 | Bslbf |
|             picture_scaling | 2 | Bslbf |
|             video_id_code | 8 | Uimsbf |
|             pixel_repetition | 4 | Bslbf |
|             reserved | 4 | |
|           } | | |
|       } | | |

FIG. 7B

| Syntax | # of bits | Mnemonic |
|---|---|---|
| if(auxiliary_information_status & 0x02){ | | |
|   AUDIO_info{ | | |
|     version | 8 | Uimsbf |
|     audio_coding_type | 4 | Bslbf |
|     audio_channel_count | 3 | Bslbf |
|     sampling_frequency | 3 | Bslbf |
|     sample_size | 2 | Bslbf |
|     reserved | 4 | |
|     max_bit_rate | 8 | Uimsbf |
|     speaker_allocation | 8 | Uimsbf |
|     down_mix | 1 | Bslbf |
|     level_shift_value | 4 | Bslbf |
|     reserved | 3 | |
|   } | | |
| } | | |
| if(auxiliary_information_status & 0x04){ | | |
|   SPD_info{ | | |
|     version | | |
|       source_device_info | 8 | Uimsbf |
|       vendor_naem_character1 | 8 | Uimsbf |
|       vendor_naem_character2 | 8 | Uimsbf |
|       vendor_naem_character3 | 8 | Uimsbf |
|       vendor_naem_character4 | 8 | Uimsbf |
|       vendor_naem_character5 | 8 | Uimsbf |
|       vendor_naem_character6 | 8 | Uimsbf |
|       vendor_naem_character7 | 8 | Uimsbf |
|       vendor_naem_character8 | 8 | Uimsbf |
|       product_description_char1 | 8 | Uimsbf |
|       product_description_char2 | 8 | Uimsbf |
|       product_description_char3 | 8 | Uimsbf |
|       product_description_char4 | 8 | Uimsbf |
|       product_description_char5 | 8 | Uimsbf |
|       product_description_char6 | 8 | Uimsbf |
|       product_description_char7 | 8 | Uimsbf |
|       product_description_char8 | 8 | Uimsbf |
|       product_description_char9 | 8 | Uimsbf |

FIG. 7C

| Syntax | # of bits | Mnemonic |
|---|---|---|
| product_description_char11 | 8 | Uimsbf |
| product_description_char12 | 8 | Uimsbf |
| product_description_char13 | 8 | Uimsbf |
| product_description_char14 | 8 | Uimsbf |
| product_description_char15 | 8 | Uimsbf |
| product_description_char16 | 8 | Uimsbf |
| } | | |
| } | | |
| } | | |
| if(auxiliary_information_status & 0x08){ | | |
|   MPEG_info{ | | |
|     version | 8 | Uimsbf |
|     mpeg_bit_rate0 | 8 | Uimsbf |
|     mpeg_bit_rate1 | 8 | Uimsbf |
|     mpeg_bit_rate2 | 8 | Uimsbf |
|     mpeg_bit_rate3 | 8 | Uimsbf |
|     field_repeat | 1 | Bslbf |
|     mpeg_frame | 2 | Bslbf |
|     reserved | 5 | |
|   } | | |
| } | | |
| if(auxiliary_information_status & 0x10){ | | |
|   GC_info{ | | |
|     version | 8 | Uimsbf |
|     cp_byte | 1 | Bslbf |
|     reserved | 7 | |
|   } | | |
| } | | |
| } | | |
| } | | |
| } | | |
| } | | |

DIGITAL CABLE TV RECEIVER, DIAGNOSIS METHOD FOR THE SAME, AND DATA STRUCTURE OF HDMI STATUS REPORT

This patent application is a continuation application of patent application Ser. No. 11/178,949, filed Jul. 12, 2005, which in turn claims the benefit of the Korean Patent Application No. 10-2004-0061804, filed on Aug. 5, 2004, both of which is hereby incorporated by reference as if fully set forth herein.

BACKGROUND OF THE INVENTION

1. Field of the Invention

The present invention relates to a cable broadcast program receiver and transmitter, and more particularly, to a digital cable TV receiver, a diagnosis method for the same, and a data structure of a HDMI status report, wherein the program receiver provides status information of a plurality of peripheral devices connected to the cable broadcast program receiver (or digital cable TV receiver) through a DVI link or a HDMI link.

2. Discussion of the Related Art

Generally, a Digital Visual Interface (DVI) is a transmission standard established by a consortium called the Digital Display Working Group (DDWG), which has been created by a group of leaders in the computer industry. The DVI is used to digitally connect a personal computer (PC) to a flat monitor. More specifically, the DVI is a standard for digitally connecting signals exchanged between the PC and the monitor. The DVI has mainly been adopted to peripheral devices that are used by being connected to a PC, such as personal computers, office projectors, general plasma displays, electric boards. And, recently, the DVI has also been adopted in digital television (TV) receivers and cable digital television (TV) receivers. Before the DVI standard was developed, digital signals were exchanged by a complicated process. First, the PC creates digital data. Then, even though the digital display device is capable of receiving digital data, the digital data transmitted from the PC is converted to analog data, which is converted back to digital data and then transmitted to the digital display device. Therefore, in order to avoid such a complicated process, the DVI standard has been developed to allow the digital data created from the PC to be digitally transmitted directly to the display device through a cable. In the DVI standard, digital broadcast signals that are not compressed are transmitted in a single direction.

A High-Definition Multimedia Interface (HDMI) is a transmission standard enabling digital audio and video signals to be connected by a single cable without compression. More specifically, since a multiple channel transmission (5.1 channel) can be performed in case of the audio signal, it will be more accurate to refer to the interface as a multimedia interface, rather than a video interface. In other words, the difference between the HDMI and the DVI is that the HDMI is smaller than the DVI, has a High-bandwidth Digital Content Protection (HDCP) coding functions provided therein, and supports multiple channel audio. Therefore, the HDMI standard enables the DVI to be adopted in both audio and video electronic appliances, whereas the DVI standard can adopt the DVI interface only in video electronic appliances. And so, since the HDMI is considered to be an updated version of the DVI, the related industry is beginning to renew the Input/Output interfaces applied to digital televisions (TVs) and Set-Top boxes from the DVI standard to the HDMI standard. Since the HDMI standard is an integration of the DVI-based HDCP and audio signals (EIA/CEA-861), the HDMI standard may also be referred to as DVI-HDMI. However, in order to make a clear distinction between the HDMI and the DVI in the present invention, the HDMI standard will simply be referred to as "HDMI". Furthermore, the DVI/HDMI described in the present invention refers to "DVI and/or HDMI" and is distinguished from the term "DVI-HDMI".

Meanwhile, a cable broadcast system broadly includes a cable broadcast station (or cable TV station) and a cable broadcast program receiver (or digital cable TV receiver). Herein, the cable broadcast station is a transmitting and receiving end transmitting cable broadcast programs, and the cable broadcast program receiver receives the transmitted cable broadcast program. The cable broadcast station may be referred to a SO head-end or a MSO head-end. The SO refers to a System Operator (SO), which is a Korean Cable System Operator (i.e., the Local Cable TV System Operator), and the MSO refers to a Multiple System Operator (MSP), which is a group of system operators.

Moreover, the cable broadcast program receiver adopts an open cable, wherein a Point of Deployment (POD) module including a Conditional Access (CA) system is separated (or detached) from the main body. For example, the POD module uses a Personal Computer Memory Card International Association (PCMCIA) card which can be mounted onto and separated from a main body slot of the cable broadcast program receiver. Therefore, the POD module may also be referred to as a cable card, and the main body, wherein the POD module is inserted, may also be referred to as a host. For example, a Digital Built-in TV or a Digital Ready TV corresponds to the host, and a combination of the host and the POD module is referred to as the cable broadcast program receiver. At this point, the host may be connected to other peripheral devices (e.g., a Digital TV, a DVD player, a digital camera/camcorder, a Set-Top box, etc.) through one of a DVI link and a HDMI link. More specifically, one or more DVI ports or HDMI ports may exist within the host. Accordingly, a plurality of peripheral devices may be connected to the host through a DVI link or a HDMI link.

Meanwhile, in the open cable standard, wherein the POD module is separated from the main body, a diagnostic function is provided to allow each status of the host to be monitored. The diagnostic function checks various statuses, such as operation status of the host and connection status of the peripheral devices. For example, in the STCE 28 2004 standard, the Generic Diagnostic Protocol is defined in a host-POD interface resource layer. The Generic Diagnostic Protocol has been defined to enable each status information of the host to be monitored in real-time through local broadcast stations (local, user) or cable broadcast stations (remote, MSO head-end). Herein, the Generic Diagnostic Protocol defines the following diagnostics shown in Table 1 below:

TABLE 1

| Diagnostic ID | Diagnostic |
| --- | --- |
| 00 | Set-Top memory allocation |
| 01 | Software version |
| 02 | Firmware version |
| 03 | MAC status |
| 04 | FAT status |
| 05 | FDC status |
| 06 | Current Channel Report |
| 07 | 1394 Port |
| 08 | DVI status |
| 09~FF | Reserved for future use |

More specifically, when a request for diagnostic is transmitted to the host from the POD module, and when the Diagnostic ID is '08', the details of the request consist of verifying the DVI status of the host and reporting the verified DVI status to the POD module.

FIG. 1 illustrates an example of a Diagnostic Confirm Object Syntax through which the host verifies a DVI status and transmits a report to the POD module. More specifically, the POD module parses a Diagnostic_cnf APDU (i.e., a Diagnostic Confirm Object Syntax) transmitted from the host and parses a report syntax corresponding to each Diagnostic ID, thereby extracting the status information for each diagnostic item. For example, in the Diagnostic Confirm Object Syntax of FIG. 1, when the parsed Diagnostic ID is '0x08', then a DVI Status Report Syntax is parsed, thereby extracting the DVI status information. In other words, when the POD module transmits a diagnostic request (Diagnostic_req APDU) to the host requesting the host to verify the DVI status and to report the verified results back to the POD module, the host checks the DVI status and transmits the results back to the POD module in the form of a DVI Status Report Syntax (Diagnostic_cnf APDU). Therefore, according to the Generic Diagnostic Protocol shown in FIG. 1, the POD module cannot request a HDMI status information from the host, and the host cannot provide any HDMI status information to the POD module.

SUMMARY OF THE INVENTION

Accordingly, the present invention is directed to a digital cable TV receiver, a diagnosis method for the same, and a data structure of a HDMI status report that substantially obviate one or more problems due to limitations and disadvantages of the related art.

An object of the present invention is to provide a digital cable TV receiver, a diagnosis method for the same, and a data structure of a HDMI status report that can transmit a request a HDMI status information from a POD module and that can verify the HDMI status and transmit the verified result to the POD module from a host.

Another object of the present invention is to provide a digital cable TV receiver, a diagnosis method for the same, and a data structure of a HDMI status report that can expand a Generic Diagnostic Protocol defined in a SCTE 28 standard (wherein, "SCTE" stands for the Society of Cable Telecommunications Engineers), so that a POD module can transmit a request for a HDMI status information.

Another object of the present invention is to provide a digital cable TV receiver, a diagnosis method for the same, and a data structure of a HDMI status report that can expand a Generic Diagnostic Protocol defined in a SCTE 28 standard, so that a host can verify the HDMI status and transmit the verified result to the POD module.

A further object of the present invention is to provide a digital cable TV receiver, a diagnosis method for the same, and a data structure of a HDMI status report that can expand a Generic Diagnostic Protocol defined in a SCTE 28 standard, so that all status information can be transmitted to the POD module, when a plurality of peripheral devices is simultaneously connected to a host through DVI/HDMI ports.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital cable TV receiver includes a POD module, and a host device comprising a controller and a HDMI port linked to a peripheral device, wherein the controller generates a HDMI status report and transmits the HDMI status report to the POD module when a diagnostic request for HDMI status is received from the POD module, the HDMI status report comprising HDMI status information associated with the peripheral device.

In another aspect of the present invention, a diagnostic method for a digital cable TV receiver includes receiving a diagnostic request for HDMI status from a POD module, and performing a diagnostic function in response to the diagnostic request by generating a HDMI status report and transmitting the HDMI status report to the POD module, the HDMI status report comprising HDMI status information associated with a peripheral device which is linked to a HDMI port.

In another aspect of the present invention, a data structure of a HDMI status report for use in a digital cable TV receiver includes a connection status field indicating whether a connection exists on a HDMI port, and HDMI status information associated with a peripheral device linked to the HDMI port.

In another aspect of the present invention, a digital cable TV receiver includes a POD module, and a host device comprising a controller, a HDMI port linked to a first peripheral device, and a DVI port linked to a second peripheral device, the controller generating a HDMI/DVI status report and transmits the HDMI/DVI status report to the POD module when a diagnostic request for HDMI/DVI status is received from the POD module, the HDMI/DVI status report comprising HDMI status information associated with the first peripheral device and DVI status information associated with the second peripheral device.

In another aspect of the present invention, a diagnostic method for a digital cable TV receiver includes receiving a diagnostic request for HDMI/DVI status from a POD module, and performing a diagnostic function in response to the diagnostic request by generating a HDMI/DVI status report and transmitting the HDMI/DVI status report to the POD module, the HDMI/DVI status report comprising HDMI status information associated with a first peripheral device which is linked to a HDMI port and DVI status information associated with a second peripheral device which is linked to a DVI port.

In a further aspect of the present invention, a data structure of a HDMI/DVI status report for use in a digital cable TV receiver includes a connection status field indicating whether a connection exists on any one of a HDMI port and a DVI port, HDMI status information associated with a first peripheral device linked to the HDMI port, and DVI status information associated with a second peripheral device linked to the DVI port.

In another aspect of the present invention, a communication card includes a controller configured to forward a request to a device external to the communication card, and the controller is further configured to receive HDMI status information associated with at least one HDMI port in response to the request.

In yet another aspect of the present invention, a method comprises the steps of forwarding a request to a device external to a communication card, and receiving HDMI status information associated with at least one HDMI port in response to the request.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates an example of a Diagnostic_cnf syntax of a general STCE standard;

FIG. 3 illustrates an example of an expanded Diagnostic_cnf syntax of the STCE standard according to the present invention;

FIGS. 4A to 4C illustrate a HDMI_DVI_status_report( ) syntax according to an embodiment of the present invention;

FIGS. 7A to 7C illustrate a HDMI_status_report( ) syntax according to another embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

The present invention relates to requesting a host from a POD module to verify a HDMI status and to report the result to the POD module, and also relates verifying the HDMI status information from the host and transmitting the result back to the POD module. As an example, in order to carry out such process, the above-described related art Generic Diagnostic Protocol is expanded. Herein, the expansion of the Generic Diagnostic Protocol is for maintaining compatibility with all cable broadcast program receivers (or digital cable TV receivers) adopting the SCTE 28 standard. As described above, the Generic Diagnostic Protocol has been defined to enable each status information of the host to be monitored in real-time through local broadcast stations (local, user) or cable broadcast stations (remote, MSO head-end).

Figure 2:
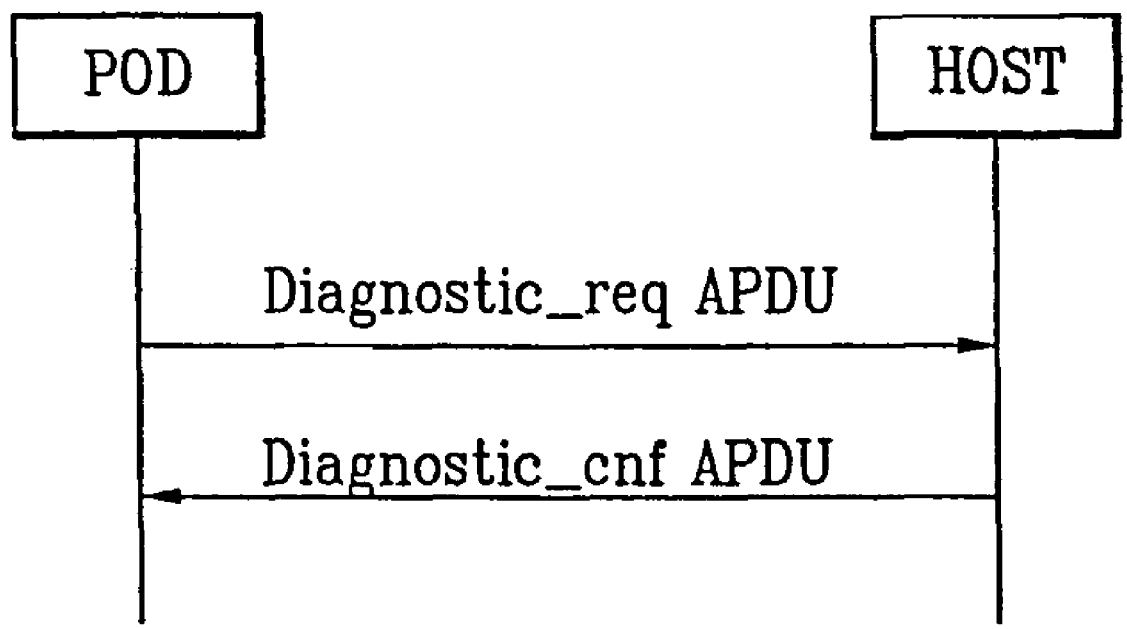
FIG. 2 illustrates an example of a message exchange protocol in a Generic Diagnostic according to the present invention.

FIG. 2 illustrates an example of a message exchange protocol in a Generic Diagnostic according to the present invention. In this example, the POD module transmits a diagnostic request (Diagnostic_req APDU) to the host, and the host transmits the diagnostic result (Diagnostic_cnf APDU) to the POD module. More specifically, when the POD module receives a diagnostic command, the POD module transmits a diagnostic request (Diagnostic_req APDU) to the host. Herein, the diagnostic request may be transmitted to the POD module from the cable broadcast station, or may be inputted directly to the POD module by a user using a remote controller. Alternatively, even when a diagnostic request is not transmitted from the POD module, the system status may be regularly (or periodically) verified from the host, and the corresponding results may be transmitted to the POD module.

For example, under the assumption that a cable broadcast program is not displayed normally, and if a diagnostic command option is provided, which can be selected by a user through a remote controller or a menu screen, the user may be able to select the diagnostic command option by using the remote controller or the menu screen. If the user is in an environment in which he/she is unable to select the diagnostic command directly, the user would contact the cable broadcast station by phone or the Internet. Thereafter, the cable broadcast station will transmit a diagnostic command to the POD module of the corresponding digital cable TV receiver.

Meanwhile, the host receiving the diagnostic request (Diagnostic_req APDU) from the POD module verifies the status of each diagnostic item corresponding to the Diagnostic ID. Then, the host reports the verified results (Diagnostic_cnf APDU) to the POD module. The POD module may either transmit the verified results (Diagnostic_cnf APDU) received from the host to the cable broadcast station or may display the verified results (Diagnostic_cnf APDU) to the user through an OSD Diagnostic application of the host. For example, if a bi-directional transmission can be performed between the cable broadcast station (or cable TV station) and the cable broadcast program receiver (or digital cable TV receiver), the diagnostic results are transmitted to the cable broadcast station through 00B. At this point, the diagnostic result may be simultaneously transmitted to the cable broadcast station and displayed on the TV screen through the OSD Diagnostic application. In case the digital cable TV receiver is mono-directional, the diagnostic result is displayed onto the TV screen through the OSD Diagnostic application. And, when the user notifies the cable broadcast station of the displayed contents, the cable broadcast station performs operations in accordance with the diagnostic results (e.g., door-to-door or wireless/wired after-services).

In the present invention, the Generic Diagnostic Protocol is expanded so that the POD module can request the host to perform a diagnostic of the DVI/HDMI status, and also that the host can verify the DVI/HDMI status and transmit the corresponding status information back to the POD module. More specifically, the definition of the diagnostic items for the Diagnostic ID being assigned as 0x08 within the Generic Diagnostic Protocol is expanded as shown in Table 2 below. And, the DVI Status Report Syntax is expanded as a DVI/HDMI Status Report Syntax shown in FIGS. 4A to 4C. In other words, the POD module includes a Diagnostic ID (i.e., 0x08) requesting a DVI/HDMI status to be diagnosed within the Diagnostic_req APDU and transmits the Diagnostic_req APDU to the host. Subsequently, the host includes all status information of all peripheral devices connected to the host by either one of the DVI link and the HDMI link within the Diagnostic_cnf APDU and transmits the Diagnostic_cnf APDU back to the POD module. Table 2 shows the Diagnostic items defined in the expanded Generic Diagnostic Protocol according to the present invention and the IDs assigned for each Diagnostic item.

TABLE 2

| Diagnostic ID | Diagnostic |
| --- | --- |
| 00 | Set-Top memory allocation |
| 01 | Software version |
| 02 | Firmware version |
| 03 | MAC status |
| 04 | FAT status |
| 05 | FDC status |
| 06 | Current Channel Report |
| 07 | 1394 Port |
| 08 | *DVI/HDMI status* |
| 09~FF | Reserved for future use |

Herein, the Diagnostic ID and item marked in bold italic characters are newly defined within the Generic Diagnostic Protocol according to the present invention. More specifically, in the new definition, when the Diagnostic ID is 0x08, all of the DVI statuses and HDMI statuses are requested to be verified and reported. The above-described Table 2 shows an embodiment having a request for diagnosing HDMI status added to the Diagnostic ID requesting the DVI status to be diagnosed.

FIG. 3 illustrates an example of a Diagnostic Confirm Object Syntax according to the present invention, which verifies the DVI or HDMI link from the host and reports the result to the POD module. More specifically, when the Diagnostic ID is 0x08, the HMDI_DVI_status_report( ) of FIGS. 4A and 4C is parsed, and the status information of the DVI links and the HMDI links are extracted.

FIGS. 4A to 4C illustrate an example of a DVI/HDMI Status Report Syntax of the General Diagnostic Protocol according to the present invention. More specifically, with the exception of a connection_status field, a host_HDCP_status field, a Device_HDCP_status field, a video_format field, a horizontal_lines field, a vertical_lines field, a scan_rate field, an aspect_ratio field, and a prog_inter_type field, the remaining fields are status information that are newly defined in the present invention. Nevertheless, the definition for each of the above-mentioned fields is also expanded to the HDMI link. Hereinafter, the DVI/HDMI Status Report Syntax of FIGS. 4A to 4C will now be described in detail.

First of all, the connection_status field indicates whether a connection exists on a DVI port or a HDMI port of the host. And, when the connection_status field value is '$00_2$', then no DVI or HDMI link (or connection) exists. Therefore, the DVI/HDMI status information can only be created when the connection_status field value is not equal to '$00_2$'. More specifically, an IF conditional statement 'if(connection_status !=0x00) { }' can be performed only when the connection_status field value is not equal to '$00_2$'. Additionally, a connection_count field is allocated with 8 bits and indicates the number of DVI/HDMI links, when peripheral devices are connected to the host by DVI link or HDMI link. For example, when a DVD Player is connected to the host by a DVI link and a Set-Top box is connected to the host by a HDMI link, the connection_status field value is equal to '2'.

Moreover, a FOR loop statement 'for(i=0; i<connection_count; i++) { }', which is repeatedly performed as much as the connection_status field value, is used for transmitting all status information to the POD module, when at least one or, most particularly, a plurality of peripheral devices are connected to the host by DVI/HDMI link. The number of repetition of the FOR loop is identical to the connection_count field value, which indicates the number of peripheral devices connection to the host by DVI/HDMI link. For example, when the connection_count field value is equal to '2', the FOR loop is repeated twice. In other words, each time the FOR loop is performed, a status information for the HDMI link is created and transmitted to the POD module. Therefore, when the FOR loop is repeated twice, the status information for a plurality of DVI/HDMI links is created and transmitted to the POD module.

Hereinafter, the fields that will now be described are all located within the repetition statement configured with the FOR loop. The connection_no field is allocated with 8 bits and is defined to indicate the order of the DVI/HDMI link. More specifically, the order consists of the order of the DVI/HDMI links having their current status information created and transmitted, when a plurality of peripheral devices is connected to the host by DVI link or HDMI link. In addition, a connection_mode field is allocated with one (1) bit and indicates whether the status information that is currently being created in the FOR loop corresponds to a DVI link or a HDMI link. For example, when a peripheral device is currently connected to the host by HDMI link, the connection_mode field value within the FOR loop is set to '1'. Conversely, when the connection_mode field value is '0', this indicates that the peripheral device is currently connected to the host by DVI link. The connection_type field is allocated with 2 bits. Herein, the connection_type field indicates the connection type between the corresponding peripheral device and the host for each DVI/HDMI link. In other words, the connection_type field indicates whether the DVI/HDMI port of the host connected to the corresponding peripheral device is a DVI/HDMI Input port, a DVI/HDMI Output port or a DVI/HDMI Input/Output port. For example, '$00_2$' indicates the DVI/HDMI Input port (i.e., an input connection only), '$01_2$' represents the DVI/HDMI Output port (i.e., an output connection only), and '$10_2$' indicates the DVI/HDMI Input/Output port (i.e., an input/output connection). Furthermore, '$11_2$' represents an unused (or reserved) status.

The host_HDCP_status field indicates whether a HDCP is enabled within the DVI/HDMI link. (Herein, 'HDCP' stands for a High-bandwidth Digital Content Protection standard.) For example, when the host_HDCP_status field value is '$00_2$', the HDCP is not enabled. The Device_HDCP_status field indicates the HDCP status of the peripheral device connected to the host through the DVI/HDMI port. The video_format field indicates the current video format used on the DVI/HDMI port. The horizontal_lines field, the vertical_lines field, the scan_rate field, the aspect_ratio field, and the prog_inter_type field create information corresponding to the video format within the DVI/HDMI link.

The fields that will now be defined correspond to HDMI status information that are created when the peripheral device is connected to the host by HDMI link, i.e., when the current connection_mode field value within the FOR loop is equal to '1'. An auxiliary_information_status field is allocated with 5 bits and is defined to indicate the status information of the peripheral device connected to the host by HDMI link. Hereinafter, a detailed description of the definition for each auxiliary_status_field value will now follow.

For example, when the value is $00000_2$, Auxiliary information (auxiliary information, only video format) does not exist. When the value is $00001_2$, an Auxiliary Video Information (AVI) InfoFrame information exists, and when the value is $00010_2$, an AUDIO InfoFrame information exists. Additionally, when the value is $00100_2$, a Source Product Description (SPD) InfoFrame information exists, and when the value is $01000_2$, an MPEG source InfoFrame information exists. Furthermore, when the value is $10000_2$, a General Control (GC) InfoFrame information exists. Therefore, when the value is $00011_2$, both the AVI InfoFrame information and the AUDIO InfoFrame information exist. And, similarly, when the value is $11111_2$, all of the AVI InfoFrame information, the AUDIO InfoFrame information, the SPD InfoFrame information, the MPEG source InfoFrame information, and the GC InfoFrame information exist. For example, when a DVD Player is currently connected to the host by HDMI link, and when the AVI information, the AUDIO information, and the MPEG information are transmitted, the auxiliary_information_status field value is equal to '$01011_2$'. Moreover, the AVI information, the AUDIO information, and the MPEG information are created by an AVI_info{} syntax, an AUDIO_info{} syntax, and an MPEG_info{} syntax. Therefore, when the auxiliary_information_status field value is parsed, and when the corresponding value is equal to '$01011_2$', the AVI_info{} syntax, the AUDIO_info{} syntax, and the MPEG_info{} syntax are parsed, so as to extract the AVI information, the AUDIO information, and the MPEG information.

Hereinafter, a detailed description of the process of creating the AVI information, the AUDIO information, the SPD information, the MPEG information, and the GC information will now follow. More specifically, when a logical product (or logical multiplication, logical AND) between the auxiliary_information_status field value and 0x01 is equal to '1', the current AVI information used within the HDMI port is created by using the next newly defined AVI information fields within the AVI_info{} syntax. The newly defined AVI information fields include a version field, a color_space field, an active_format field, a bar_info field, a scan_info field, an aspect_ratio field, an active_format_aspect_ratio field, a picture_scaling field, a video_id_code field, and a pixel_repetition field.

The version field indicates the AVI InfoFrame version. The color_space field indicates the color space information associated with the video on the current HDMI link. For example, each value indicates the following:
  $00_2$=RGB;
  $01_2$=YCbCr 4:2:2;
  $10_2$=YCbCr 4:4:4; and
  $11_2$=reserved.

The active_format field indicates the present active format associated with the video on the HDMI link. For example, each value indicates the following:
  $0_2$=No data; and
  $1_2$=Active format information valid.

The bar_info field indicates the bar information associated with the video on the HDMI link. For example, each value indicates the following:
  $00_2$=Bar data not valid;
  $01_2$=Vertical Bar information valid;
  $10_2$=Horizontal Bar information valid; and
  $11_2$=Vertical and Horizontal Bar information valid.

The scan_info field indicates the scan information associated with the video on the HDMI link. For example, each value indicates the following:
  $00_2$=No data;
  $01_2$=Overscanned (television);
  $10_2$=Underscanned (computer); and
  $11_2$=reserved.

The colorimetry field indicates the colorimetry information associated with the video on the HDMI link. For example, each value indicates the following:
  $00_2$=No data;
  $01_2$=SMPTE 170M or ITU601;
  $10_2$=ITU709; and
  $11_2$=reserved.

The aspect_ratio field indicates the picture aspect ratio associated with the video on the HDMI link. For example, each value indicates the following:
  $00_2$=No data;
  $01_2$=4:3;
  $10_2$=16:9; and
  $11_2$=reserved.

The active_format_aspect_ratio field indicates the active format aspect ratio associated with the video on the HDMI link. For example, each value indicates the following:
  $1000_2$=Same as picture aspect ratio;
  $1001_2$=4:3 (Center);
  $1010_2$=16:9 (Center);
  $1011_2$=14:9 (Center); and
  other=per DVB AFD active format field.

The picture_scaling field indicates the non-uniform picture scaling associated with the video on the HDMI link. For example, each value indicates the following:
  $00_2$=No known non-uniform scaling;
  $01_2$=Picture has been scaled horizontally;
  $10_2$=Picture has been scaled vertically; and
  $11_2$=Picture has been scaled horizontally and vertically.

The video_id_code field indicates the video identification code for CEA Short Descriptors associated with the video on the HDMI link. And, the pixel_repetition field indicates the pixel repetition associated with the video on the HDMI link. For example, each value indicates the following:
  $0000_2$=No repetition (i.e., pixel sent once);
  $0001_2$=pixel sent 2 times (i.e., repeated once);
  $0010_2$=pixel sent 3 times;
  $0011_2$=pixel sent 4 times;
  $0100_2$=pixel sent 5 times;
  $0101_2$=pixel sent 6 times;
  $0110_2$=pixel sent 7 times;
  $0111_2$=pixel sent 8 times;
  $1000_2$=pixel sent 9 times;
  $1001_2$=pixel sent 10 times; and
  others=reserved.

Meanwhile, when a logical product (or logical multiplication, logical AND) between the auxiliary_information_status field value and 0x02 is equal to '1', the current audio information used within the HDMI port is created by using the next newly defined audio information fields within the AUDIO_info{} syntax. In other words, when a logical product (or logical multiplication, logical AND) between the auxiliary_information_status field value and 0x02 is equal to '1', the current Auxiliary Video Information (AVI) InfoFrame used on the HDMI port is indicated. The newly defined audio information fields include a version field, an audio_coding_type field, an audio_channel_count field, a sampling frequency field, a sample_size field, a max_bit_rate field, a speaker_allocation field, a down_mix field, and a level_shift_value field.

The version field indicates an AUDIO InfoFrame version. And, the audio_coding_type field indicates the audio coding type associated with the audio on the HDMI link. For example, each value indicates the following:
  $0000_2$=Refer to stream header;
  $0001_2$=IEC60958 PCM;
  $0010_2$=AC-3;
  $0011_2$=MPEG1 (Layers 1 & 2);
  $0100_2$=MP3 (MPEG1 Layer 3);
  $0101_2$=MPEG2 (multichannel);
  $0110_2$=AAC;
  $0111_2$=DTS;
  $1000_2$=ATRAC; and
  others=reserved.

The audio_channel_count field indicates the audio channel count associated with the audio on the HDMI link. For example, each value indicates the following:
  $000_2$=Refer to stream header;
  $001_2$=2ch;
  $010_2$=3ch;
  $011_2$=4ch;

$100_2$=5ch;
$110_2$=7ch; and
$111_2$=8ch.

The sampling_frequency field indicates the sampling frequency count associated with the audio on the HDMI link. For example, each value indicates the following:
$000_2$=Refer to stream header;
$001_2$=32 kHz;
$010_2$=44.1 kHz (CD);
$011_2$=48 kHz;
$100_2$=88.2 kHz;
$101_2$=96 kHz;
$110_2$=176.4 kHz; and
$111_2$=192 kHz.

The sample_size field indicates the sample size associated with the audio on the HDMI link. For example, each value indicates the following:
$00_2$=Refer to stream header;
$01_2$=16 bit;
$10_2$=20 bit; and
$11_2$=24 bit.

The max_bit_rate field indicates the maximum bit rate associated with the audio on the HDMI link. The speaker_allocation field indicates the speaker allocation associated with the audio on the HDMI link. And, the down_mix field indicates the down mix associated with the audio on the HDMI link. For example, each value indicates the following:
$0_2$=Permitted or no information about any assertion of this; and
$1_2$=Prohibited.

The level_shift_value field indicates the level shift value associated with the audio on the HDMI link. Herein, the level_shift_value field uses the dB unit. Meanwhile, when a logical product (or logical multiplication, logical AND) between the auxiliary_information_status field value and 0x04 is equal to '1', the current Source Product Description (SPD) information used within the HDMI port is created by using the next newly defined SPD information fields within the SPD_info{} syntax. In other words, when a logical product (or logical multiplication, logical AND) between the auxiliary_information_status field value and 0x04 is equal to '1', the current SPD InfoFrame used on the HDMI port is indicated. The newly defined SPD information fields include a version field, a source_device_info field, vendor_name_character1 to vendor_name_character8 fields, and product_description_char1 to product_description_char16 fields.

The version field indicates an SPD InfoFrame version. The source_device_info field indicates the source device information associated with the source product description format on the HDMI link. For example, each value indicates the following:
$00_h$=unknown;
$01_h$=Digital STB;
$02_h$=DVD;
$03_h$=D-VHS;
$04_h$=HDD Video;
$05_h$=DVC;
$06_h$=DSC;
$07_h$=Video CD;
$08_h$=Game;
$09_h$=PC general; and
others=reserved.

The vendor_name_character1~8 fields each indicates the vendor name character associated with the source product description format on the HDMI link. These fields correspond to a 7 bit ASCII code. And, the product_description_char1~16 fields each indicates the product description character associated with the source product description format on the HDMI link. These fields also correspond to a 7 bit ASCII code. Meanwhile, when a logical product (or logical multiplication, logical AND) between the auxiliary_information_status field value and 0x08 is equal to '1', the current MPEG information used within the HDMI port is created by using the next newly defined MPEG information fields within the MPEG_info{} syntax. In other words, when a logical product (or logical multiplication, logical AND) between the auxiliary_information_status field value and 0x08 is equal to '1', the current MPEG InfoFrame used on the HDMI port is indicated. Herein, the newly defined MPEG information fields include a version field, mpeg bit_rate0 to mpeg_bitrate3 fields, a field_repeat field, and a mpeg_frame field.

The version field indicates an MPEG source InfoFrame version. And, the mpeg_bit_rate0~3 fields each indicates the MPEG bit rate associated with the MPEG source on the HDMI link. The MPEG bit rate is stored as 32 bits and is expressed in Hz units. The mpeg_bit_rate0 field includes the least significant byte, whereas the mpeg_bitrate3 field includes the most significant byte. If the MPEG rate is unknown, or if the field is not applied, all of the bits within the mpeg_bit_rate0~3 fields are set to '0'. For example:
If, 10 Mbps→10,000,000 Hz (dec.)→0x00 98 96 80 (hex.) Upper, Lower Byte,
mpeg_bit_rate0 0x80 Lower Byte;
mpeg_bit_rate1 0x96;
mpeg_bit_rate2 0x98; and
mpeg_bit_rate3 0x00 Upper.

The field_repeat field indicates the field repeat for 3:2 pull-down associated with the MPEG source on the HDMI link. For example, each value indicates the following:
$0_2$=New field (or picture); and
$1_2$=Repeated field.

The mpeg_frame field indicates the MPEG frame associated with the MPEG source on the HDMI link. For example, each value indicates the following:
$00_2$=unknown (no data);
$01_2$=I Picture;
$10_2$=B Picture; and
$11_2$=P Picture.

Meanwhile, when a logical product (or logical multiplication, logical AND) between the auxiliary_information_status field value and 0x10 is equal to '1', the current General Control (GC) information used within the HDMI port is created by using the next newly defined GC information fields within the GC_info{} syntax. In other words, when a logical product (or logical multiplication, logical AND) between the auxiliary_information_status field value and 0x10 is equal to '1', the current GC InfoFrame used on the HDMI port is indicated. The newly defined GC information fields include a version field, and a cp_byte field. The version field indicates a GC InfoFrame version. And, the cp_byte field indicates the cp byte associated with the general control packet on the HDMI link. For example, each value indicates the following:
$0_2$=Set Audio/Video Mute; and
$1_2$=Clear Audio/Video Mute.

As described above, all of the status information for the DVI links or the HDMI links that are connected to the host is created by using the DVI/HDMI Status Report Syntax. Herein, the number and content of the fields that are newly defined in FIG. 4 only correspond to a preferred embodiment of the present invention. Therefore, since variations and modifications may be made by the author (or designer) of the standard and of the system, the present invention is not limited to the proposed embodiments described herein. Furthermore, the contents defined for each value in each of the fields correspond only to the preferred embodiment of the present invention and are not limited to the embodiments described herein.

Referring to FIGS. 4A to 4C, the host verifies all of the DVI and HDMI link statuses and creates a HDMI_DVI Status Report Syntax that is to be reported to the POD module. First of all, whether or not a DVI/HDMI link exists is indicated in the connection_status field value. Thereafter, when the connection_status field value is not equal to '0', i.e., when at least one or more DVI/HDMI links exist, the number of DVI/HDMI links existing within the host is indicated in the connection_status field. Subsequently, the FOR loop is repeated as much as the number indicated in the connection_status field. Each time the FOR loop is performed, a status information of the DVI link or the HDMI link is created.

Figure 5:
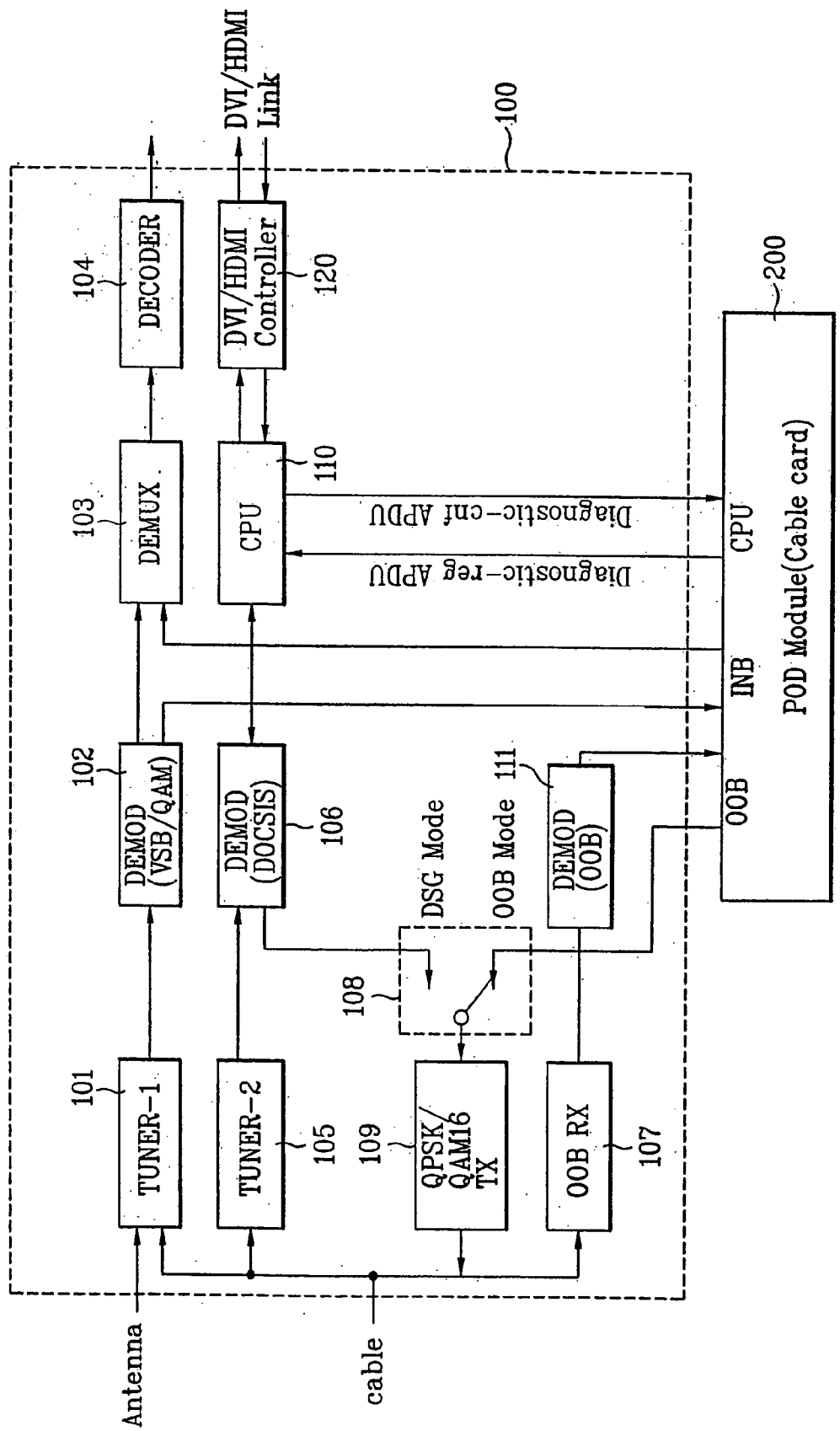
FIG. 5 illustrates an example of a digital cable TV receiver according to the present invention.

FIG. 5 illustrates an example of a digital cable TV receiver including a DVI/HDMI controller according to the present invention. The digital cable TV receiver broadly includes a host 100, and a POD module 200 that can be mounted to or dismounted (or separated) from a slot of the host 100. The host 100 may either be used to receive cable broadcast programs only or be used to receive all types of broadcast programs including cable broadcast programs, ground wave (or terrestrial) broadcast programs, and satellite broadcast programs. FIG. 5 illustrates an example of a cable digital television that can receive both cable and ground wave broadcast programs.

In addition, there are two types of data broadcast program transmission methods, wherein data broadcast programs such as stocks information or weather forecast are transmitted. More specifically, an Out Of Band (OOB) method and a DOCSIS Set-top Gateway (DSG) method are proposed as a method for upstream services within an open cable. The data broadcast program may be viewed at the moment a viewer views the television (TV) and selects a desired program. Alternatively, the data broadcast program may be viewed when the viewer directly interacts with the broadcast program or when the viewer selects the information he or she needs. The OOB method is most commonly used in the United States, and the DSG method is most commonly used in the Republic of Korea. However, in Korea, discussion is still under process as to which type of method is to be selected as the Korean standard. Herein, the types of method that are under discussion include the OOB-only method, the OOB/DSG combined method, the DSG-only method, etc.

The OOB method is a standard that defines a transmission standard between intersect equipments within a cable broadcast station (head-end) and a Set-Top box. The DSG method relates to a transmission method between a cable modem control system of a cable broadcast station and a DOCSIS-based cable modem within a Set-Top box. The DOCSIS refers to a digital cable TV standard adopted by CableLabs, which is a U.S. cable broadcast standard certification organization. The DOCSIS standard uses cable modem to allow data to be transmitted. The example of a digital cable TV receiver using the OOB/DSG combined method is shown in FIG. 5. However, this is only one of the preferred embodiments of the present invention, and one of an OOB-only digital cable TV receiver and a DSG-only digital cable TV receiver may be used according to the present invention.

Figure 6:
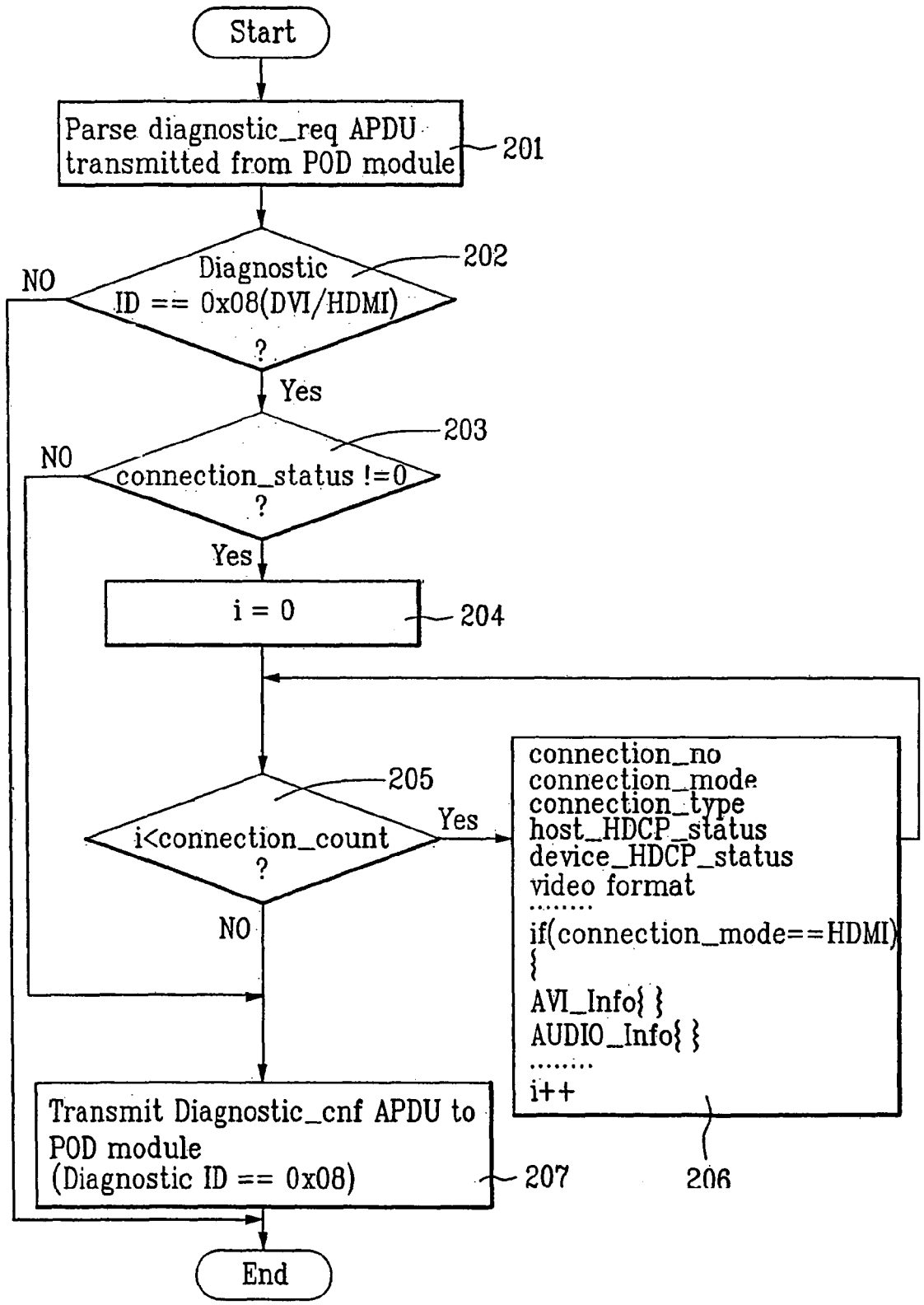
FIG. 6 illustrates a flow chart of process steps for creating and transmitting DVI/HDMI status information according to an embodiment of the present invention.

FIG. 6 illustrates a flow chart of process steps for creating and transmitting DVI/HDMI status information according to the present invention. Hereinafter, an embodiment according to the present invention will now be described with reference to FIG. 2 to FIG. 6. More specifically, in the host 100, a tuner 101 tunes only a specific channel frequency from ground wave Audio/Video (A/V) broadcasting, which is transmitted through an antenna, and cable A/V broadcasting, which is transmitted by In-band through a cable. Then, the tuned channel frequency is transmitted to a first demodulator 102. Since each of the ground wave broadcasting and the cable broadcasting has a different transmission method, each of the decoding methods within the first demodulator 102 is also different from one another. In other words, the ground wave A/V broadcasting is demodulated to a Vestigial Sideband (VSB) Modulation method and transmitted accordingly, and the cable A/V broadcasting is demodulated to a Quadrature Amplitude Modulation (QAM) method and transmitted accordingly. Therefore, when the channel frequency tuned from the tuner 101 is a ground wave broadcast channel frequency, the tuned channel frequency is demodulated to a VSB method from the first demodulator 102. Alternatively, when the channel frequency tuned from the tuner 101 is a cable broadcast channel frequency, the tuned channel frequency is demodulated to a QAM method from the first demodulator 102.

In case of the ground wave broadcasting, the demodulated signal transmitted from the first demodulator 102 is transmitted to a demultiplexer 103. And, in case of the cable broadcasting, the demodulated signal is transmitted to the demultiplexer 103 through the POD module 200 mounted on the slot. The POD module 200 includes a Conditional Access (CA) system for preventing high value-added broadcast contents from being copied and for providing restricted access. The POD module 200 is also referred to as a cable card. When a scramble occurs in the cable A/V broadcasting, the POD module descrambles the cable A/V broadcasting, which is then transmitted to the demultiplexer 103. When the POD module 200 is not inserted in the slot, the cable A/V broadcasting demodulated from the first demodulator 102 is directly transmitted to the demultiplexer 103. In this case, the scrambled cable A/V broadcasting cannot be descrambled, and therefore the viewers are unable to view the broadcast program normally.

The demultiplexer 103 receives the multiplexed signal and separates the multiplexed signal to a video signal and an audio signal. Thereafter, the demultiplexer 103 transmits the separated signals to a decoder 104. The decoder 104 recovers the compressed A/V signal to its initial state by using a video decoding algorithm and an audio decoding algorithm, respectively, and then outputs the recovered signal for display. Meanwhile, a second tuner 105 tunes a specific channel frequency among the data broadcasting transmitted through cable by the DSG method and transmits the tuned channel frequency to a second demodulator 106. The second demodulator 106 demodulates the DSG type data broadcasting, which is then transmitted to a CPU 110. Moreover, a third tuner 107 tunes a specific channel frequency among the data broadcasting transmitted through cable by the OOB method and transmits the tuned channel frequency to a third demodulator 111. The third demodulator 111 demodulates the OOB type data broadcasting by using a Quarternary Phase Shift Key (QPSK) method, which is then transmitted to the POD module 200. More specifically, since the OOB type uses the QPSK transmission method, a receiving end also uses a QPSK type modulation.

Furthermore, when a bi-directional telecommunication between the cable broadcast station (or cable TV station) and the cable broadcast program receiver (or digital cable TV receiver) can be performed, the information (e.g., paid program subscription, Diagnostic information of the host, etc.) transmitted from the cable broadcast program receiver to the cable broadcast station is transmitted by one of the OOB method and the DSG method. This is why a switching unit 108 is provided herein. More specifically, when the OOB type transmission is used, user information or System Diagnostic information is transmitted to a modulator 109 through the POD module 200 and the switching unit 108. Then, the information is modulated by using the QPSK method from the modulator 109, which is then transmitted to the cable broadcast station through cable. On the other hand, when using the DSG type transmission, the information is transmitted to the modulator 109 through the CPU 110 and the switching unit 108. Thereafter, the information is modulated by using a QAM-16 method from the modulator 109, which is then transmitted to the cable broadcast station through cable.

Meanwhile, the CPU 110 parses the Diagnostic_req APDU, which is transmitted from the POD module 200 (S201). Then, the CPU 110 verifies whether '0x08' is included within the Diagnostic ID (S202). When the 0x08 is included, the DVI/HDMI status is verified by using a DVI/HDMI controller 120, and the verified result is created, as shown in FIGS. 4A to 4C, and is transmitted to the POD module 200. More specifically, the DVI/HDMI controller 120 first verifies whether peripheral devices are connected to the host by DVI/HDMI link and also verifies the number of the connected peripheral devices, so as to set up (or determine) the connection_status field value and the connection_count field value. Subsequently, the DVI/HDMI controller 120 determines whether the connection_status field value is '0' (S203). When the connection_status field value is '0', there are no peripheral devices connected to the host by DVI/HDMI link. Accordingly, the process step is skipped to Step 207, thereby transmitting a Diagnostic_cnf APDU to the POD module 200, which indicates that no DVI/HDMI status information is included.

In the above-described Step 203, when the connection_status field value is not '0', at least one peripheral device is connected to the host by DVI/HDMI link, and so the process step proceeds to Step 204. Thereafter, a variable i is initialized to '0' so as to determine whether the value of the variable i is lower (or smaller) than the connection_count field value (S205). The variable i is a value that is compared with the connection_count field value in order to transmit all of the DVI/HDMI link status information of more than one peripheral devices to the POD module. Herein, the variable i is increased by '1' each time the FOR loop is performed. Therefore, in the above-described Step 205, when the value of the variable i is lower than the connection_count field value, this indicates that there still remain DVI/HDMI link status information which have not been transmitted to the POD module 200. At this point, the process proceeds to Step 206, wherein the connection_no field, the connection_mode field, the connection_type field, the host_HDCP_status field, the device_HDCP_status field, and the video format information are created. The video format information includes horizontal_lines information, vertical_lines information, scan_rate information, aspect_ratio information, and prog_inter_type information. Moreover, when the connection_mode field value is not equal to '0', i.e., when the current status information is the status information for a HDMI link, an auxiliary_information_status field value is created, and the AVI information, the AUDIO information, the SPD information, the MPEG information, and the GC information that are associated with the HDMI link are also created in accordance with the auxiliary_information_status field value. In other words, the above-described Step 204 to Step 206 correspond to the FOR loop repetition statement of FIG. 4.

Furthermore, in the above-described Step 205, when the value of the i variable is determined to be lower than the connection_count field value, this indicates that all status information for the DVI/HDMI links, which will be transmitted to the POD module 200, is created. And so, the process proceeds to Step 207. The status information for all of the DVI/HDMI links of the host, which is created each time the FOR loop is performed, is included in the Diagnostic_cnf APDU, which is then transmitted to the POD module 200.

As described above, the process of creating and transmitting DVI/HDMI status information may either be performed by using hardware or performed by using middleware or software. Also, the DVI/HDMI controller 120 may either be included in the CPU 110 or formed externally, as shown in FIG. 5. In the above-described embodiment of the present invention, the POD module uses a Diagnostic ID in order to request the host to diagnose all statuses for the DVI/HDMI links. And, the host verifies all status information of the DVI links and the HDMI links and transmits the corresponding results to the POD module.

Meanwhile, in another embodiment of the present invention, the Generic Diagnostic Protocol may be expanded so that a Diagnostic ID is assigned for each of the DVI Diagnostic and the HDMI Diagnostic. Thus, a request for each of the DVI Diagnostic and the HDMI Diagnostic may be distinguished (or identified) from one another and separately transmitted to the POD module. Then, in accordance with the received Diagnostic ID, the host may verify only one of the DVI status information and the HDMI status information and transmit the verified result to the POD module. Table 3 and Table 4 show each Diagnostic item defined in the expanded Generic Diagnostic Protocol and the Diagnostic IDs assigned item.

TABLE 3

| Diagnostic ID | Diagnostic |
|---|---|
| 00 | Set-Top memory allocation |
| 01 | Software version |
| 02 | Firmware version |
| 03 | MAC status |
| 04 | FAT status |
| 05 | FDC status |
| 06 | Current Channel Report |
| 07 | 1394 Port |
| 08 | DVI status |
| *09* | *HDMI status* |
| 0A~FF | Reserved for future use |

TABLE 4

| Diagnostic ID | Diagnostic |
|---|---|
| 00 | Set-Top memory allocation |
| 01 | Software version |
| 02 | Firmware version |
| 03 | MAC status |
| 04 | FAT status |
| 05 | FDC status |
| 06 | Current Channel Report |
| 07 | 1394 Port |
| 08 | DVI status |
| *09* | *HDMI status* |
| *0A* | *DVI/HDMI status* |
| 0B~FF | Reserved for future use |

More specifically, in Table 3 and Table 4, the Diagnostic ID and item marked in bold italic characters are newly defined within the Generic Diagnostic Protocol according to the present invention. In Table 3, when the Diagnostic ID is 0x08, the host verifies the DVI status and transmits the verified result to the POD module. On the other hand, when the Diagnostic ID is 0x09, the host verifies the HDMI status and transmits the verified result to the POD module. In Table 4, a new definition for verifying the status of all DVI/HDMI links by using a single Diagnostic ID is added to Table 3. At this point, '0A' is assigned as the newly defined Diagnostic ID. In the above-described Table 3 and Table 4, the Diagnostic ID for the HDMI being assigned as '09' and the Diagnostic ID for the DVI/HDMI being assigned as '0A' are only details of a preferred embodiment of the present invention. The author (or designer) of the standard and of the system may choose to assign other reserved ID values other than '09' and '0A' as the Diagnostic ID, which is not limited to the values proposed in the above-described embodiments of the present invention. Furthermore, when the POD module requests only the HDMI status to be diagnosed, and when the host verifies the status information for all HDMI links only and transmits the verified results to the POD module, the DVI/HDMI controller of the digital cable TV receiver shown in FIG. 5 may be replaced with a HDMI controller.

FIGS. 7A to 7C illustrate an example of a HDMI Status Report Syntax of the Generic Diagnostic Protocol, which is created when the POD module requests a Diagnostic of the HDMI status. More specifically, the HDMI Status Report Syntax of FIGS. 7A to 7C is configured by deleting the connection_mode field shown in FIGS. 4A to 4C and by deleting the line for comparing whether the connection_mode field value is equal to '1'. Also, the description for each of the fields of the HDMI Status Report Syntax is identical to those described in FIGS. 4A to 4C and will, therefore, be omitted for simplicity. At this point, the connection_status field, the host_HDCP_status field, the Device_HDCP_status field, the video_format field, the horizontal_lines field, the vertical_lines field, the scan_rate field, the aspect_ratio field, and the prog_inter_type field creates only the information associated with the HDMI link.

Figure 8:
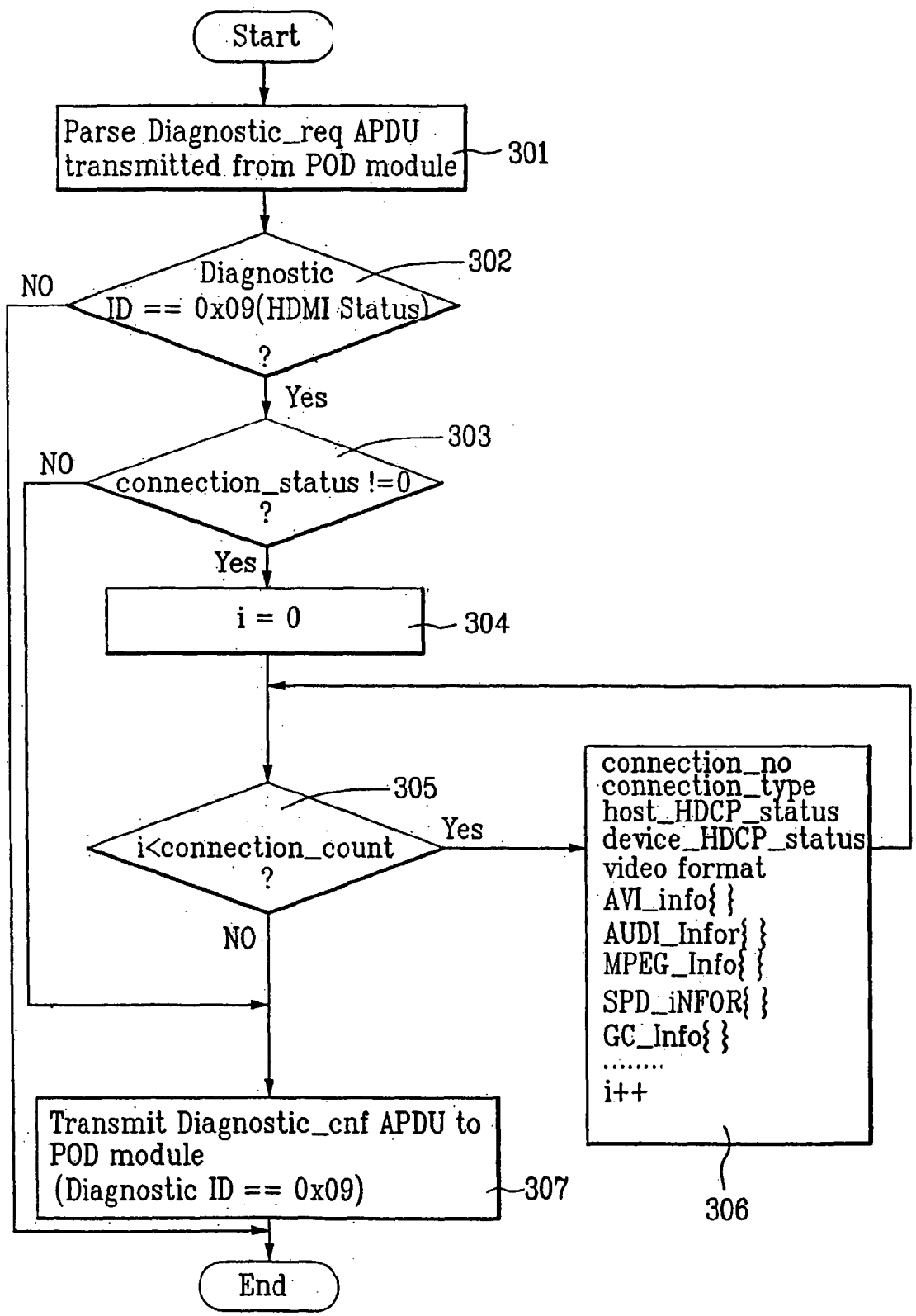
FIG. 8 illustrates a flow chart of process steps for creating and transmitting HDMI status information according to another embodiment of the present invention.

FIG. 8 illustrates a flow chart of process steps for creating and transmitting HDMI status information according to another embodiment of the present invention. More specifically, the CPU 110 parses the Diagnostic_req APDU, which is transmitted from the POD module 200 (S301). Then, the CPU 110 verifies whether '0x09' is included within the Diagnostic ID (S302). When the 0x09 is included, the HDMI status is verified, and the verified result is transmitted to the POD module 200. In other words, whether or not peripheral devices are connected to the host by HDMI link is verified, and the number of the connected peripheral devices is also verified, so as to set up (or determine) the connection status field value and the connection_count field value. Thereafter, whether or not the connection_status field value is '0' is verified (S303). When the connection_status field value is '0', there are no peripheral devices connected to the host by HDMI link. Accordingly, the process step is skipped to Step 307, thereby transmitting a Diagnostic_cnf APDU to the POD module 200, which indicates that no HDMI status information is included.

In the above-described Step 303, when the connection_status field value is not '0', at least one peripheral device is connected to the host by HDMI link, and so the process step proceeds to Step 304. Thereafter, a variable i is initialized to '0' so as to determine whether the value of the variable i is lower (or smaller) than the connection_count field value (S305). The variable i is a value that is compared with the connection_count field value in order to transmit all of the HDMI link status information of more than one peripheral devices to the POD module 200. Herein, the variable i is increased by '1' each time the FOR loop is performed. Therefore, in the above-described Step 305, when the value of the variable i is lower than the connection_count field value, this indicates that there still remain HDMI link status information which have not been transmitted to the POD module 200. At this point, the process proceeds to Step 306, wherein the connection_no field, the connection_type field, the host_HDCP_status field, the device_HDCP_status field, and the video format information are created. Herein, the video format information includes horizontal_lines information, vertical_lines information, scan_rate information, aspect_ratio information, and prog_inter_type information. Thereafter, an auxiliary_information_status field value is created, and the AVI information, the AUDIO information, the SPD information, the MPEG information, and the GC information that are associated with the HDMI link are also created in accordance with the auxiliary_information_status field value. In other words, the above-described Step 304 to Step 306 correspond to the FOR loop repetition statement of FIG. 7.

Meanwhile, in the above-described Step 305, when the value of the i variable is determined to be lower than the connection_count field value, this indicates that all status information for the HDMI links, which will be transmitted to the POD module 200, is created. And so, the process step proceeds to Step 307. The status information for all of the HDMI links of the host, which is created each time the FOR loop is performed, is included in the Diagnostic_cnf APDU, which is then transmitted to the POD module 200.

As described above, the present invention may be applied to all types of television receivers and Set-Top boxes supporting cable broadcast programs. Most particularly, the present invention can be applied to all types of digital cable TV receivers adopting the SCTE 28 standard. Meanwhile, preferred embodiments have been proposed in the description of the present invention. Therefore, when considering the technical difficulty of the present invention, those skilled in the art are fully capable of modifying the present invention so as to propose other embodiments of the present invention. Evidently, it will be apparent that such modifications do not depart from the scope and spirit of the present invention.

In the above described digital cable TV receiver, diagnosis method for the same, and data structure of the HDMI status report according to the present invention, the POD module may request the host to verify and report the HDMI status, and the host may verify the HDMI status information and transmit the verified result to the POD module. Thus, the host may transmit not only the DVI status information but also the HDMI status information to the POD module. Furthermore, the present invention expands an Diagnostic ID and a Diagnostic Status Report Syntax within a Generic Diagnostic Protocol defined in the SCTE 28 standard, so as to create the status information for all of the DVI links and the HDMI links for the connections within the host and to transmit the status information to the POD module, thereby facilitating the expansion and providing compatibility of the Diagnostic ID and the Diagnostic Status Report Syntax, so that it can be applied to all types of digital cable TV receivers adopting the SCTE 28 standard.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A cable card of an open cable system, the cable card comprising:
    a controller configured to forward a request to a host in the open cable system; and
    the controller is further configured to receive High-Definition Multimedia Interface (HDMI) status information associated with a plurality of HDMI ports in response to the request, wherein the HDMI status information is received through a CPU interface, the CPU interface including a generic diagnostic resource assigning diagnostic identifiers to corresponding diagnostic items, respectively, and wherein a single diagnostic identifier of the diagnostic identifiers is assigned to the HDMI status information wherein the generic diagnostic resource enables the cable card to receive the HDMI status information including audio coding format, audio sampling frequency and audio sample size associated with audio utilized on each of the HDMI ports, wherein the HDMI status information further includes information indicating whether each of peripheral devices linked to each of the HDMI ports uses HDMI or digital visual interface (DVI), wherein when the HDMI status information includes multiple diagnostics corresponding to the plurality of HDMI ports, the multiple diagnostics are identified by the same diagnostic identifier, and wherein the HDMI status information includes connect status information indicating whether a connection exists on each of the HDMI ports, host HDCP status information indicating whether a HDCP is enabled on each of the HDMI ports, device HDCP status information indicating a HDCP status of each of the peripheral devices connected to the host, and video format information indicating a current video format used on each of the HDMI ports.

2. The cable card of claim 1, wherein the HDMI status information identifies whether each of the HDMI ports associated with the HDMI status information is one of an HDMI input port, an HDMI output port, and an HDMI input/output port.

3. The cable card of claim 1, wherein the video format information includes at least one of horizontal_lines information, vertical_lines information, aspect_ratio information, prog_inter_type information.

4. The cable card of claim 1, wherein the cable card communicates with the host based on the generic diagnostic resource.

5. A method of communicating with a host in an open cable system, the method, comprising:
 forwarding a request to the host from a controller of a cable card; and
 receiving High-Definition Multimedia Interface (HDMI) status information associated with a plurality of HDMI ports in response to the request in the controller of the cable card,
 wherein the HDMI status information is received through a CPU interface, the CPU interface including a generic diagnostic resource assigning diagnostic identifiers to corresponding diagnostic items, respectively, and wherein a single diagnostic identifier of the diagnostic identifiers is assigned to the HDMI status information,
 wherein the generic diagnostic resource enables the cable card to receive the HDMI status information including audio coding format, audio sampling frequency and audio sample size associated with audio utilized on the HDMI port,
 wherein the HDMI status information further includes information indicating whether each of peripheral devices linked to each of the HDMI ports uses HDMI or digital visual interface (DVI),
 wherein when the HDMI status information includes multiple diagnostics corresponding to the plurality of HDMI ports, the multiple diagnostics are identified by the same diagnostic identifier, and
 wherein the HDMI status information includes connect status information indicating whether a connection exists on each of the HDMI ports, host HDCP status information indicating whether a HDCP is enabled on each of the HDMI ports, device HDCP status information indicating a HDCP status of each of the peripheral devices connected to the host, and video format information indicating a current video format used on each of the HDMI ports.

6. The method of claim 5, further comprising retrieving information in the HDMI status information that identifies whether each of the HDMI ports associated with the HDMI status information is one of an HDMI input port, an HDMI output port, and an HDMI input/output port, in the controller.

7. The method of claim 5, further comprising forwarding the request using the generic diagnostic resource, in the controller.

8. The method of claim 5, wherein the video format information includes at least one of horizontal_lines information, vertical_lines information, aspect_ration information, prog_inter_type information.

* * * * *